United States Patent Office 3,117,063
Patented Jan. 7, 1964

3,117,063
METHOD OF REFINING AMYLOGLUCOSIDASE
Thomas L. Hurst and Almeria W. Turner, Decatur, Ill., assignors to A. E. Staley Manufacturing Company, Decatur, Ill., a corporation of Delaware
No Drawing. Filed July 30, 1962, Ser. No. 213,120
10 Claims. (Cl. 195—31)

This invention relates to refining amyloglucosidase preparations to remove carbohydrate-synthesizing enzymes therefrom, e.g. isomaltose synthetase and maltose transglucosidase, whereby the refined enzyme can hydrolyze starch and its intermediate products more extensively to glucose. More specifically, this invention relates to refining amyloglucosidase preparations to remove carbohydrate-synthesizing enzymes therefrom using at least one refining agent selected from each of the following two classes:

(A) Lignin or tannic acid which are the subject of our application Serial No. 58,206, filed September 26, 1960, now U.S. Patent No. 3,047,471.

(B) Sulfonated higher alcohols, alkylated aromatic sulfonic acid or di-(2-ethylhexyl) phosphate which are the subject of our application Serial No. 89,349, filed February 15, 1961, now U.S. Patent No. 3,067,108.

This application is a continuation-in-part of both of the applications identified above.

In our applications Serial Nos. 58,206 and 89,349, we have pointed out that amyloglucosidase preparations produced according to United States Patents 2,557,078, 2,881,115 and 2,893,921, for example, are unable to hydrolyze starch or starch-derived substrate (acid hydrolyzed starches, alpha amylase hydrolyzed starches, etc.) completely to glucose. At commercially feasible initial concentrations the amyloglucosidase hydrolysis of a starch-derived substrate, follows a course such that the dextrose content, dry substance basis (D) increases with time until the D either levels off at about 0.86 or "peaks" at about that value and then declines. The numerical value of D at the leveling off or peak region is referred to hereinafter as the glucogenic activity of the amyloglucosidase composition, where D is the percent by weight of glucose in the total solids. Attention is called to the fact that the glucogenic activity of an amyloglucosidase preparation has no necessary connection with the unit potency of the composition as determined according to United States Patent 2,893,921.

We have pointed out that in the manufacture of crystalline glucose by the amyloglucosidase hydrolysis of starch and its intermediate hydrolytic products, as described in United States Patents 2,531,999, 2,567,000, and 2,583,451 and as suggested in United States Patent 2,881,115, it is generally desirable to obtain the highest possible conversion or hydrolysis of starchy substrate to glucose. High degree of hydrolysis facilitates the crystallization of glucose from the concentrated hydrolyzate because the non-glucose hydrolysis products (maltose, isomaltose, higher sugars and dextrins) inhibit the glucose crystallization. Also, high degree of hydrolysis increases the yield of glucose while decreasing the yield of often unwanted mother liquor solids. Although useful enzyme processes for the manufacture of crystalline glucose from starch and starch hydrolysis products can be based on the prior art amyloglucosidase preparations, those processes would obviously be improved if the enzyme preparations were capable of hydrolyzing the substrate to glucose to a substantially greater extent, i.e., if their glucogenic activities were greater.

In our copending applications Serial Nos. 58,206 and 89,349 we have disclosed that the glucogenic activity of amyloglucosidase preparation can be increased by treating prior art amyloglucosidase preparations with various refining agents defined above as class A and class B. As pointed out in the above applications, we believe that these treating agents enable the removal and/or result in the inactivation of one or more carbohydrate synthesizing enzymes from the amylogucosidase preparation, and that maltose transglucosidase is among those enzymes removed. The identity and function of maltose transglucosidase are discussed by Pan et al. (Arch. Biochem. Biophys. 42, 421–434) and by Pazur and French (J. Biol. Chem. 196, 265–272).

On the one hand the refining agents of class A selectively precipitate interfering carbohydrate synthesizing enzyme or enzymes from the amyloglucosidase preparation. No increase in glucogenic activity is obtained from the use of class A refining agents unless the precipitate is removed from the amyloglucosidase preparation. On the other hand, the refining agents of class B apparently inactivate interfering enzyme or enzymes and the glucogenic activity of the amylglucosidase preparation is improved regardless of whether or not a precipitate, which is usually formed, is removed from the preparation.

While both the class A and class B enzyme-refining agents are extremely useful, we have found that each of these classes of enzyme refining agents has certain drawbacks. On the one hand, glucose prepared using an amyloglucosidase preparation which has been refined with a class A enzyme-refining agent is more expensive than glucose prepared from an amyloglucosidase preparation which has been refined with a class B enzyme-refining agent, since (1) the class A refining agents are more expensive than the class B refining agents and (2) the class A refining agents are not as effective as the class B refining agents on a weight basis (i.e. it takes more of a class A enzyme refining agent to refine an amyloglucosidase preparation to the same extent than of a class B enzyme refining agent). Further, when the class A enzyme refining agents are employed in a sufficiently large concentration to precipitate all transglucosidase from the amyloglucosidase preparation, the selectivity of the class A enzyme-refining agents is decreased somewhat and some amyloglucosidase is precipitated from the preparation along with the transglucosidase.

On the other hand, the class B enzyme-refining agents, even when filtered from the amyloglucosidase preparation, leave debris in the amyloglucosidase preparation. While this debris has no known detrimental effect on the glucogenic activity of the class B enzyme-refining agents, the debris subsequently turns up in the starch-hydrolyzate and tends to inhibit the glucose crystallization and/or is an undesirable impurity in the final glucose product. The object of this invention is to provide an economical method of refining amyloglucosidase preparations to remove carbohydrate-synthesizing enzymes therefrom without leaving undesirable debris in the amyloglucosidase preparation.

We have now found that by using a combination of a refining agent of class A and a refining agent of class B, it is possible to refine amyloglucosidase preparations economically without leaving any debris in the amyloglucosidase preparation. Surprisingly, we have found that the class A enzyme-refining precipitate the debris normally formed when a class B enzyme-refining agent is employed. When the class A refining agents are used in this way, the removal of additional transglucosidase from the amyloglucosidase preparation is of only secondary importance and an additional benefit. The principal purpose of the class A refining agents in this invention is to remove the debris formed by the class B enzyme-refining agents.

Briefly, our invention comprises mixing a small proportion of a class A refining agent and a class B refining agent with a solution or dispersion of an amyloglucosidase preparation. The amyloglucosidase preparation is then partitioned or physically separated from the precipitated or coagulated interfering enzymes. The liquid portion, which retains the treated or purified amyloglucosidase preparation, may be used as such in the hydrolysis of starch and intermediate starch hydrolysis products to glucose, or it may be concentrated, evaporated to dryness, or dehydrated with a water-miscible organic liquid such as acetone or ethanol prior to use.

The principal starch-hydrolyzing enzyme in the preparations contemplated by this invention has been given several different names. Among these are gamma amylase, glucamylase, starch glucogenase, maltase, and amyloglucosidase. The enzyme is distinguished from other starch hydrolyzing enzymes by its property of hydrolyzing starch to glucose unaccompanied by the concurrent formation of substantial amounts of low molecular weight intermediate hydrolytic products such as maltose, maltotriose, higher sugars, and soluble dextrins. The enzyme appears to function by removing glucose units one at a time starting at the non-reducing end of a starch chain. The enzyme also hydrolyzes maltose, maltotriose and other intermediate hydrolytic products of starch to glucoase.

The amyloglucosidase preparations which can be used in this invention are derived from molds and bacteria, generally by submerged fermentation, but by other techniques also. The enzyme preparation is generally in the form of a filtered or centrifuged fermentation beer, but it may have other forms. Among these are: (1) the whole fermentation mixture or culture including the micro-organism, (2) dried whole culture, (3) dried fermentation beer, (4) aqueous extract of dried whole culture and (5) a concentrated dried material obtained by precipitating the starch-hydrolyzing enzyme from the filtered or centrifuged fermentation beer with a dehydrating agent such as acetone or ethanol.

Examples of genera of micro-organisms which can be cultured by known methods to yield whole fermentation mixtures and fermentation beers containing commercially attractive concentrations of amyloglucosidase are Aspergillus, Mucor, Clostridium, and Rhizopus. The following species are examples of good producers of amyloglucosidase: *Aspergillus oryzae, Clostridium acetobutylicum, Rhizopus delemar, Aspergillus niger, Aspergillus phoenicis, Aspergillus awamori, Aspergillus niveus,* and *Aspergillus flavus.*

The preparation of amyloglucosidase in the form of whole cultures and fermentation beers is described in United States Patents 2,557,078, 2,881,115, and 2,893,921. Purification of a crude amylgucosidase preparation, the water etxaract of *Rhizopus delemar,* is described at pages 3359–3365, volume 73 of the Journal of the American Chemical Society.

The refining agents of class B include sulfonated higher alcohols, alkylated aromatic sulfonic acids and the 2-ethylhexyl ester of orthophosphoric acid, which may be used either as the free acid or as a water-soluble salt thereof. The sodium salt of the acid is the preferred form, but other water-soluble salts such as lithium, potassium, ammonia, lower alkyl amines and quaternary ammonium hydroxides are equally effective. The free acids suitable in our method are represented by the following structural formulae:

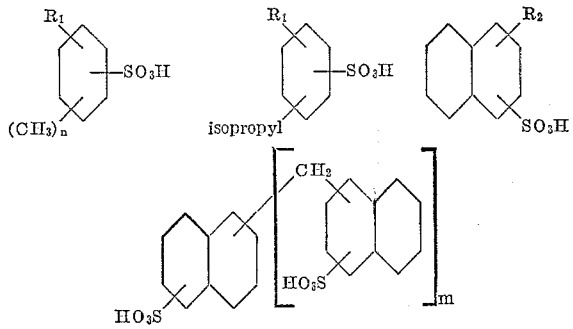

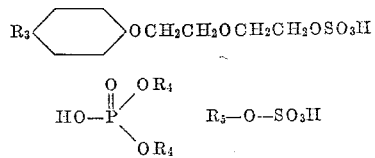

In the above formulae, $R_1$ is an alkyl radical of 10–15 carbon atoms, $R_2$ is an alkyl radical of 3–5 carbon atoms, $R_3$ may be either $CH_3-C(CH_3)_2-CH_2-C(CH_3)_2-$ or $CH_3-C(CH_3)_2-CH_2-C(CH_3)_2-CH_2-C(CH_3)_2-$, $R_4$ is 2-ethylhexyl, $R_5$ is an alkyl radical of 14–18 carbon atoms, $n$ is an integer ranging from 0 to 2, and $m$ is an integer ranging from 1 to 6.

Methods by which the foregoing sulfonic acids and sulfuric acid esters may be prepared are discussed in chapters 3 and 5 of Surface Active Agents—Their Chemistry and Technology, by A. M. Schwartz and J. W. Perry, 1949 edition, Interscience Publishers, Incorporated. The di-2-ethylhexyl ester of orthosphorhoric acid may be made by known methods.

Specific examples of acids embraced by the foregoing structural formulae are: monokeryl benzene monosulfonic acid wherein the keryl substituent is an alkyl group averaging about 15 carbon atoms derived from a highly saturated kerosene, monodecyl benzene monosulfonic acid, monopentadecyl benzene monosulfonic acid, monokeryl toluene monosulfonic acid, monokeryl xylene monosulfonic acid, monokeryl cumene monosulfonic acid, monoisopropyl naphthalene monosulfonic acid, monoisoamyl naphthalene monosulfonic acid, the acid ester of sulfuric acid and 7-ethyl-2-methyl-4-undecanol, and the acid ester of sulfuric acid and 3,9-diethyl-6-tridecanol.

The class B refining agents are used in the proportions set forth in the above parent application. In other words, an amyloglucosidase preparation having an enzyme potency of up to 150 units per milliliter can be refined with from about 0.01 to 0.2 part by weight of an enzyme refining agent of class B per each 100 parts by weight of amyloglucosidase preparation. If more potent amyloglucosidase preparation are prepared, as by precipitating the enzyme from a beer with alcohol and then dissolving the precipitate in a limited proportion of water, the above specified minimum weight ratio of refining agent must be increased in direct proportion to the increased potency.

The enzyme refining agents of class A include lignin and tannic acid. Alkali lignin recovered from alkali wood pulp liquors is the preferred form of lignin. It is insoluble in water alone, but soluble in water solutions of the strong alkalis such as sodium hydroxide. It is available commercially in the "free" or "acid" form, which requires alkali for solution, and in the sodium-salt form, which dissolves in warm water. Any of the commercially available forms of crude and refined tannic acid are suitable. Tannic acid is soluble in water. These enzyme refining agents are used in a concentration of about 0.01 part up to about 1 part (preferably 0.1 to 0.4 part) by weight per 100 parts by weight of amyloglucosidase preparation having an enzyme potency up to 150 units per milliliter.

In somewhat greater detail, a refining agent of class A and a refining agent of class B are dissolved in water to form a single solution or two separate solutions of moderate concentration, e.g. 5–10% by weight of the material. The concentration of the solution or solutions is not critical, however, and values above and below the 5–10% range may be used if desired. The solution or solutions are then mixed in a suitable concentration with the aqueous amyloglucosidase preparation. Alternatively either of the refining agents or both can be added in the dry or pure state to the aqueous amyloglucosidase preparation. A solution is preferred because this reduces the likelihood of precipitating or inactivating some of the amyloglucosidase by localized high concentration of refining agent.

While the refining agents can be added in either order or together, it is preferable to add the class B refining agent to the amyloglucosidase preparation and then add the class A refining agent in order to ensure the complete precipitation of all debris formed by the class B refining agent. The time required for either the class A or class B protein refining agents to increase the glucogenic power of the amyloglucosidase preparation is quite short. Likewise, little time is required for the class A refining agents to remove the debris formed by the class B refining agents. We have found that 15–30 minutes of moderate agitation with each class of refining agents is adequate, but that shorter times are effective.

The amyloglucosidase preparation is then partitioned from coagulated or precipitated enzyme and debris resulting from the treatment with the enzyme refining agents. The separation can be carried out by decanting off the clear supernatant liquid after a period of settling or by filtering or centrifuging.

The refining agents useful in our method have a pH plateau of maximum effectiveness ranging from about 4 pH downward to values of 2 and less. Their effectiveness decreases rapidly with increasing treatment pH above about 4 and is vanishingly small at about 5 pH. Owing to the sensitivity of amyloglucosidase to low pH values, particularly at about 3 pH and below, the preferred treatment pH in our method is the upper range of the above-mentioned plateau, i.e. 3–4 pH. Also, it is desirable, when carrying out our method at the lower pH values, to keep the temperature down (e.g. 20° C. or less) to reduce loss of amyloglucosidase by pH inactivation.

The preferred temperature of our method, at the preferred pH of 3–4, is 20°–40° C. Lower temperatures down to the freezing point of the preparations may be used, if desired, but the cost and inconvenience of providing the lower temperature more than offsets the gain of a slightly reduced loss of amyloglucosidase due to pH inactivation. Temperatures above 40° C. are operative with respect to precipitating or inactivating the undesirable enzymes, but values in excess of 55–60° C. are undesirable because they can cause temperature inactivation of the amyloglucosidase. The temperature control of our method is determined largely by the freezing of the aqueous amyloglucosidase preparation on one hand, and by the inactivation of amyloglucosidase at elevated temperatures on the other hand. The selective precipitation or inactivation of undesired enzymes with the refining agent is only slightly influenced by temperature over the range 0°–60° C.

The following examples are illustrative and should not be construed as limiting the scope of the invention.

*Example I*

This example illustrates the application of our invention to an amyloglucosidase preparation obtained by filtering the culture beer of an *Aspergillus phoenicis* fermentation performed as described in Example I of United States Patent 2,893,921. The amyloglucosidase potency of the filtered beer is 90 units per milliliter, as determined according to the method described at lines 29–41, column 2, of the patent. Into one liter of the filtered beer at 30° C. and 4 pH were stirred 5 grams of a 10% aqueous solution (.5 gram dry solids basis) of monokeryl benzene monosulfonic acid (Conoco LS–320). The mixture was adjusted to 3.5 pH with dilute hydrochloric and stirred for 30 minutes. Then 20 grams of a dilute sodium hydroxide solution containing 2 grams of purified lignin (Indulin AT) were stirred into the beer. The beer was adjusted to 3.5 pH with dilute hydrochloric acid, stirred for thirty minutes and then filtered through coarse filter paper. The clear filtrate contained no debris.

A second amyloglucosidase preparation was prepared in the same manner as above except that the beer was not treated with lignin. The filtrate contained a substantial concentration of debris. The "debris" was colloidally dispersed material which formed on the addition of the refining agent.

A third amyloglucosidase preparation was prepared in the same manner as above except that the beer was treated with lignin and not with monokeryl benzene monosulfonic acid. The clear filtrate contained no debris.

The original and treated beers were then examined for ability to hydrolyze acid thinned corn starch paste or syrup as follows: 100 ml. aliquots of the thinned paste at 60° C. (30–35% solids by weight, 15 D.E., 4 pH, prepared by careful autoclaving of a 35% solids corn starch slurry at 1.9 pH with hydrochloric acid, cooling, and neutralizing to 4 pH with soda ash) were measured into four 4-ounce bottles and placed in an incubator at 60° F. Four and two-tenths ml. of amyloglucosidase broth, refined in each of the aforementioned three ways, was placed in a bottle and 3.9 ml. of unrefined amyloglucosidase broth was placed in another bottle. After 72 hours each of the bottles was withdrawn from the incubator and analyzed for glucose by the glucose-oxidase method described at page 109 in volume 31 (1959) of Analytical Chemistry. The analytical results are set forth below.

| Refining agent: | Glucose content |
|---|---|
| Monokeryl benzene monosulfonic acid and lignin | 93.9 |
| Monokeryl benzene monosulfonic acid | 90.0 |
| Lignin | 92.0 |
| None | 87.5 |

The above example indicates that thinned starch paste is converted to a decidedly higher glucose content by enzyme refined with both monokeryl benzene monosulfonic acid and lignin, than it is with enzyme refined with only one or with none of these refining agents. The above example also indicates that lignin effectively removes debris formed by monokeryl benzene monosulfonic acid refining agents.

*Example II*

Example I was repeated with essentially the same results except that the 2 grams of lignin was replaced with 4 grams of tannic acid. The beer refined solely with monokeryl benzene monosulfonic acid contained debris after filtration. On the other hand, when tannic acid was used with the monokeryl benzene monosulfonic acid the filtrate did not contain debris. The 72-hour saccharification data is set forth below.

| Refining agent: | Glucose content |
|---|---|
| Monokeryl benzene monosulfonic acid and tannic acid | 92.3 |
| Monokeryl benzene monosulfonic acid | 90.0 |
| Tannic acid | 91.4 |
| None | 87.5 |

*Example III*

Example I was repeated with essentially the same results except that the sodium salt of monokeryl benzene monosulfonate was Colgate Mentor Beads. The beer refined solely with the the sodium salt of monokeryl benzene monosulfonic acid contained debris after filtration, while the beer refined with both refining agents resulted in debris-free filtrate. The 72 hour saccharification data is set forth below:

| Refining agent: | Glucose content |
|---|---|
| Sodium salt of monokeryl benzene monosulfonic acid and lignin | 93.8 |
| Sodium salt of monokeryl benzene monosulfonic acid | 89.2 |
| Lignin | 92.0 |
| None | 87.5 |

Example IV

Example I was repeated with essentially the same results using Nacconol NRSF as the source of monokeryl benzene sulfonate and Politol S as the source of lignin. The beer refined solely with the sodium salt of monokeryl benzene monosulfonic acid contained debris after filtration, while the beer refined with both refining agents resulted in a debris-free filtrate. Electrophoresis data indicated that the beer refined with both refining agents contained no transglucosidase.

Example V

Example I was repeated with essentially the same results except that 0.5 gram (dry weight) of Tergitol Anionic No. 7 (a long chain alcohol sulfate) was employed in place of monokeryl benzene monosulfonic acid. The beer refined solely with Tergitol Anionic No. 7 contained debris after filtration, while the beer refined with both refining agents resulted in a debris-free filtrate. Electrophoresis data indicated that the beer refined with both refining agents contained no transglucosidase.

Example VI

Example I was repeated with essentially the same results except that 0.5 gram (dry weight) of di(2-ethylhexyl) sodium phosphate was used in place of monokeryl benzene monosulfonic acid. The beer refined solely with di-(2-ethylhexyl) sodium phosphate contained debris after filtration, while the beer refined with both refining agents resulted in a debris-free filtrate. Electrophoresis data indicated that the beer refined with both refining agents contained a low level of transglucosidase.

As used in the foregoing description and in the appended claims, the term "starch" designates all native starches whether derived from root, stem, or fruit of a plant, and whether waxy or non-waxy, i.e. whether composed of amylopectin or of a mixture of amylopectin and amylose. The term starch, as used herein, includes also the separated fractions of non-waxy starch (amylose and amylopectin), the lightly oxidized starches, the acid-modified starches, the lightly thermally-modified starches or dextrins, and the starch derivatives (i.e starch ethers and esters.

Since many embodiments of this invention may be made and since many changes may be made in the embodiments described, the foregoing is to be interpreted as illustrative only and our invention is defined by the claims appended hereafter.

We claim:

1. The method of increasing the glucogenic activity of aqueous amyloglucosidase preparation which comprises mixing with said preparation at a pH within a range of 2 to 5 an effective amount of an amyloglucosidase-refining agent selected from the group consisting of acids having the structural formulae

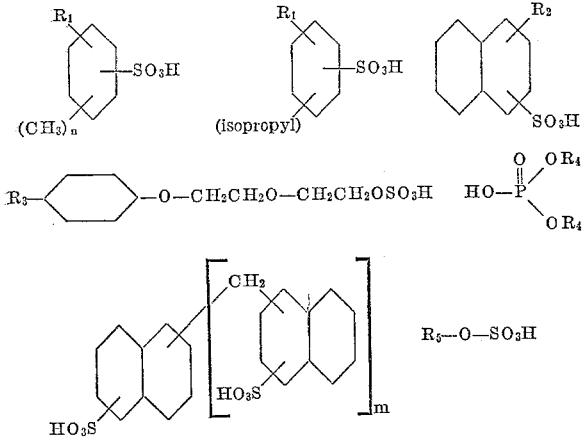

wherein $R_1$ is an alkyl radical of 10-15 carbon atoms, $R_2$ is an alkyl radical of 3–5 carbon atoms, $R_3$ is an alkyl radical selected from the group consisting of $$CH_3C(CH_3)_2CH_2C(CH_3)_2—$$

and $$CH_3C(CH_3)_2CH_2C(CH_3)_2CH_2C(CH_3)_2—$$

$R_4$ is 2-ethylhexyl, $R_5$ is an alkyl radical of 14–18 carbon atoms, $n$ is a number selected from the group consisting of 0, 1 and 2 and $m$ is an integer ranging from 1 to 6 and water-soluble salts of said acids and an effective amount of a second amyloglucosidase-refining agent capable of precipitating debris formed on the addition of the refining agent of the above structural formulae selected from the group consisting of lignin, tannic acid and the water-soluble salts thereof, and separating solids from said aqueous amyloglucosidase preparation whereby a debris-free aqueous solution of amyloglucosidase having increased glucogenic activity is obtained.

2. The method of increasing the glucogenic activity of aqueous amyloglucosidase preparation which comprises the steps of first mixing with said preparation at a pH of 2 to 5 an effective amount of an amyloglucosidase-refining agent selected from the group consisting of acids having the structural formula

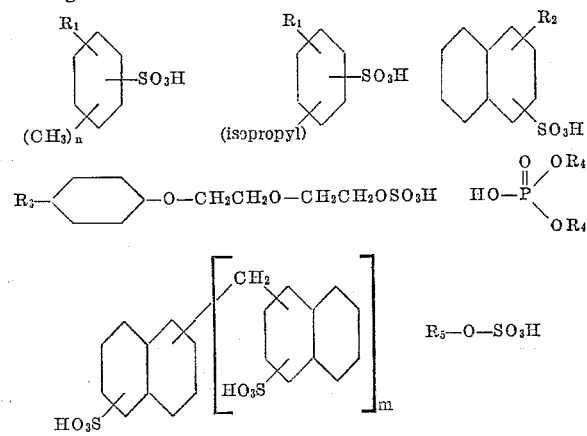

wherein $R_1$ is an alkyl radical of 10-15 carbon atoms, $R_2$ is an alkyl radical of 3–5 carbon atoms, $R_3$ is an alkyl radical selected from the group consisting of $$CH_3C(CH_3)_2CH_2C(CH_3)_2—$$

and $$CH_3C(CH_3)_2CH_2C(CH_3)_2CH_2C(CH_3)_2—$$

$R_4$ is 2-ethylhexyl, $R_5$ is an alkyl radical of 14–18 carbon atoms, $n$ is a number selected from the group consisting of 0, 1, 2 and $m$ is an integer ranging from 1 to 6 and water-soluble salts of said acids and then mixing with said preparation at a pH of 2 to 5 an effective amount of an amyloglucosidase-refining agent capable of precipitating debris selected from the group consisting of lignin, tannic acid and the water-soluble salts thereof, and then separating solids from said aqueous amyloglucosidase preparation whereby a debris-free aqueous solution of amyloglucosidase having increased glucogenic activity is obtained.

3. The method of claim 2 wherein the amyloglucosidase preparation is maintained at a temperature of from about 0° to 60° C.

4. The method of claim 2 wherein the amyloglucosidase refining agent mixed in said first step comprises from about 0.01 to 0.2 parts per 100 parts by weight of the aqueous amyloglucosidase preparation.

5. The method of claim 4 wherein the amyloglucosidase refining agent mixed in said second step comprises from about 0.01 to 1.0 part per 100 parts by weight of the aqueous amyloglucosidase preparation.

6. The method according to claim 2 wherein the second treating agent comprises a water-soluble salt of lignin.

7. The method according to claim 6 wherein the first treating agent comprises a compound having the formula

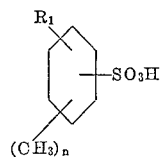

8. The method according to claim 6 wherein the first treating agent comprises a water-soluble salt of a compound having the formula R—O—SO$_3$H.

9. The method of hydrolyzing starch to glucose in aqueous medium with an amyloglucosidase preparation refined according to claim 1.

10. The method of hydrolyzing starch to glucose in aqueous medium with an amyloglucosidase preparation refined according to claim 2.

No references cited.

UNITED STATES PATENT OFFICE
CERTIFICATE OF CORRECTION

Patent No. 3,117,063　　　　　　　　　　　　　　　January 7, 1964

Thomas L. Hurst et al.

It is hereby certified that error appears in the above numbered patent requiring correction and that the said Letters Patent should read as corrected below.

Column 2, line 7, for "function" read -- functioning --; line 19, for "amylglucosidase" read -- amyloglucosidase --; line 61, after "enzyme-refining" insert -- agents --; column 3, line 50, for "etxaract" read -- extract --; column 6, line 13, for "60° F." read -- 60° C. --; column 7, line 44, for "esters." read -- esters). --.

Signed and sealed this 16th day of June 1964.

(SEAL)
Attest:

ERNEST W. SWIDER　　　　　　　　　　　　　　EDWARD J. BRENNER
Attesting Officer　　　　　　　　　　　　　　　Commissioner of Patents